(12) United States Patent
Saleh

(10) Patent No.: US 11,866,519 B2
(45) Date of Patent: Jan. 9, 2024

(54) CELLULOSE-CONTAINING MATERIALS

(71) Applicant: Wool Research Organisation of New Zealand Incorporated, Christchurch (NZ)

(72) Inventor: Mirshahin Seyed Saleh, Christchurch (NZ)

(73) Assignee: Wool Research Organisation of New Zealand Incorporated, Christchurch (NZ)

(*) Notice: Subject to any disclaimer, the term of this patent is extended or adjusted under 35 U.S.C. 154(b) by 135 days.

(21) Appl. No.: 17/276,089

(22) PCT Filed: Sep. 18, 2019

(86) PCT No.: PCT/NZ2019/050126
§ 371 (c)(1),
(2) Date: Apr. 2, 2021

(87) PCT Pub. No.: WO2020/060419
PCT Pub. Date: Mar. 26, 2020

(65) Prior Publication Data
US 2021/0269554 A1    Sep. 2, 2021

(30) Foreign Application Priority Data

Sep. 18, 2018 (AU) ................................ 2018903502

(51) Int. Cl.
C08B 3/04 (2006.01)
C08B 3/28 (2006.01)

(52) U.S. Cl.
CPC . C08B 3/04 (2013.01); C08B 3/28 (2013.01)

(58) Field of Classification Search
None
See application file for complete search history.

(56) References Cited

U.S. PATENT DOCUMENTS

| | | | |
|---|---|---|---|
| 1,656,119 A | 1/1928 | Gerard | |
| 4,839,113 A * | 6/1989 | Villaine | C08K 3/32 264/211.13 |
| 7,465,321 B2 | 12/2008 | Kelly | |
| 2008/0241536 A1 | 10/2008 | Luo | |
| 2014/0090640 A1 | 4/2014 | Shih | |

FOREIGN PATENT DOCUMENTS

| | | |
|---|---|---|
| CN | 85108974 A | 5/1987 |
| CN | 103341214 A | 10/2013 |
| CN | 104764736 A | 7/2015 |
| CN | 104764872 A | 7/2015 |
| CN | 105153316 A | 12/2015 |
| CN | 106469762 A | 3/2017 |
| CN | 106867000 A | 6/2017 |
| EP | 2835391 A1 | 11/2015 |
| GB | 260650 A | 11/1926 |
| GB | 287540 A | 1/1928 |
| GB | 190917036 A | 1/1928 |
| GB | 287540 A | 11/1928 |
| GB | 275641 A | 1/1929 |
| GB | 690566 A | 4/1953 |
| WO | 2001/045917 A1 | 6/2001 |
| WO | 2013/043062 A1 | 3/2013 |
| WO | 2017/155456 A1 | 9/2017 |

OTHER PUBLICATIONS

McCall et al., "Chemical Composition of Cotton" Textile Research Journal Jan. 1951, pp. 19-21 (Year: 1951).*
"Polysaccharide-based Fibers and Composites", Lucian Lucia and Ali Ayoub, Editors, published by Springer, chapter 5 pp. 78-117 (Year: 2018).*
Zeronian et al., "Bleaching of cellulose by hydrogen peroxide" Cellulose vol. 2 pp. 265-272 (Year: 1995).*
International Search Report and Written Opinion received for PCT Serial No. PCT/NZ2019/050126 dated Oct. 29, 2019, 8 pgs.
Office Action dated Mar. 8, 2022 for Chinese Application No. 2019800630878.
Extended European Search Report for European Application No. 19863307.5 (EESR), dated May 20, 2022, 6 pgs.
Second Office Action dated Oct. 13, 2022 for Chinese Application No. 201980063087.8, 9 pgs.
Third Office Action dated Apr. 20, 2023 for Chinese Application No. 201980063087.8, 10 pgs.

* cited by examiner

*Primary Examiner* — Eric Olson
(74) *Attorney, Agent, or Firm* — Spencer Fane, LLP

(57) ABSTRACT

Disclosed is a process for solubilising cellulose and coagulating the resulting solution to form a cellulose-containing material. The process comprises contacting a cellulose source with a solvent comprising zinc ions and formic acid to provide a solution, coagulating the solution to provide a solid material, treating the solid material, and isolating the solid material after treatment, to provide the cellulose-containing material. The process can further comprise solubilising protein and coagulating the resulting solution to form a cellulose/protein-containing material. The cellulose-containing materials and cellulose/protein-containing materials can be produced, for example, as reconstituted fibres and films.

19 Claims, No Drawings

CELLULOSE-CONTAINING MATERIALS

REFERENCE TO RELATED APPLICATIONS

This application claims priority to PCT Application Number PCT/NZ2019/050126, filed on Sep. 18, 2019, which claims priority to Australian Application Number 2018903502, filed on Sep. 18, 2018, the contents of which are incorporated herein by reference.

FIELD OF THE INVENTION

The present invention relates to a process for solubilising cellulose and coagulating the resulting solution to form a cellulose-containing material. The process can further comprise solubilising protein and coagulating the resulting solution to form a cellulose/protein-containing material.

BACKGROUND

Natural fibres such as cotton, wool and silk have many desirable properties in textile and other applications, including sustainability due to their natural origin, their interaction with moisture and the resulting comfort next to the skin. Their use in textile applications is widespread. Natural fibres have limitations, including their fibre diameter, which is a key determinant of softness and results from the natural fibre formation process, as does their staple length. In addition, the surface structure of some fibres, such as wool, is not smooth and this may create problems during fibre processing and use.

Fibres can be made through extrusion processes, such as wet spinning or melt spinning. Such fibres are typically continuous filament, with a controllable diameter and with a smooth or controllable surface topography. Extrusion processes may, therefore, overcome several of the limitations of natural fibres.

Many materials, such as cellulose and keratin in their native states, for example in cotton or in wool, are not, however, suitable for wet spinning or melt spinning. Low degree of polymerisation (DP) native cellulose with a DP of up to 1000, such as wood pulp, can be processed through chemical modification to make it soluble in a wet spinning system, such as in the well-known rayon and lyocell processes. These processes are not generally suitable for cellulose with a DP over 1200, such as cotton, because they do not render the cellulose soluble.

Derivatisation to create cellulose acetate also provides materials that are extrudable through wet spinning or solvent spinning systems, and such materials are commonly use in the creation of textile fibres. Unlike cellulose acetate, however, the previous use of cellulose formate has been limited due to the instability of the material and its susceptibility to degradation. The use of zinc salts in the presence of formic acid to dissolve cellulose is known in the art (CN 105153316 and US 2014/0090640), however, these approaches leave the cellulose susceptible to hydrolysis and dissolution under acidic conditions. This leads to loss of degree of polymerisation and weakening of any subsequently reconstituted materials.

Cellulose formate derivatives have been prepared using formic acid and zinc halides under concentrated conditions that may avoid hydrolysis (GB 260650 and GB 275641). Other processes for preparing cellulose formate have relied on additional phosphoric acid to achieve the reaction conditions favourable for formylation (U.S. Pat. No. 4,839,113).

Keratin derived from wool or other sources, such feathers, horns and hooves, has also been processed to create extruded fibres, typically with chemical modification to create a derivative suitable for wet spinning. Such derivatisation may use reduction (GB 690566), sulfitolysis (U.S. Pat. No. 7,465,321) or alkali treatment (WO 2013/043062) to create an extrudable liquid.

Accordingly, it is an object of the present invention to go some way to avoiding the above disadvantages; and/or to at least provide the public with a useful choice.

Other objects of the invention may become apparent from the following description which is given by way of example only.

SUMMARY OF THE INVENTION

In a first aspect, the present invention provides a process for producing a cellulose-containing material comprising:
 (a) contacting a cellulose source with a solvent comprising zinc ions and formic acid to provide a solution;
 (b) extruding the solution from (a) into a coagulation bath to provide a solid material;
 (c) immersing the solid material from (b) in an oxidising solution;
 (d) freezing the oxidising solution in which the solid material is immersed; and
 (e) isolating the solid material from (d) to provide the cellulose-containing material.

In a second aspect, the present invention provides a process for producing a cellulose-containing material comprising:
 (a) contacting a cellulose source with a solvent comprising zinc ions and formic acid to provide a solution;
 (b) extruding the solution from (a) into a coagulation bath to provide a solid material;
 (c) immersing the solid material from (b) in water;
 (d) freezing the water in which the solid material is immersed; and
 (e) isolating the solid material from (d) to provide the cellulose-containing material.

In a third aspect, the present invention provides a process for producing a cellulose-containing material comprising:
 (a) contacting a cellulose source with a solvent comprising zinc ions and formic acid to provide a solution;
 (b) extruding the solution from (a) into a coagulation bath to provide a solid material;
 (c) immersing the solid material from (b) in an aqueous formate salt solution; and
 (d) isolating the solid material from (c) to provide the cellulose-containing material.

In one embodiment of any of the first to third aspects, the cellulose source comprises cellulose with a degree of polymerisation of at least about 1000. In another embodiment, the cellulose source comprises cellulose with a degree of polymerisation of at least about 1200. In another embodiment, the cellulose source comprises cellulose with a degree of polymerisation of up to about 5000.

In one embodiment of any of the first to third aspects, the cellulose source comprises cotton. In another embodiment, the cellulose source comprises wood pulp.

The cellulose source may comprise a plant part. In one embodiment, the plant part is a leaf or petal.

The cellulose source may comprise a mixture of two or more cellulose sources.

In one embodiment of any of the first to third aspects, the solvent comprises less than about 10% w/w water. In another embodiment, the solvent comprises less than about 5% w/w water. In another embodiment, the solvent comprises less than about 2% w/w water. In another embodiment, the solvent comprises less than about 1% w/w water.

In one embodiment of any of the first to third aspects, the solvent comprises a solution of zinc formate and formic acid. In one embodiment, the concentration of zinc formate is about 20% w/v to about 40% w/v and, in another embodiment, the concentration of zinc formate is about 40% w/v.

The process may further comprise producing the solution of zinc formate and formic acid from a zinc halide and formic acid. The zinc halide may be selected from zinc chloride, zinc bromide or a mixture thereof. In one embodiment, the concentration of zinc halide is about 10% w/v to about 50% w/v. In another embodiment, the concentration of zinc halide is about 20% w/v to about 45% w/v. In another embodiment, the concentration of zinc halide is about 40% w/v and, in another embodiment, the concentration of zinc halide is about 25% w/v.

The cellulose source and solvent may be contacted for about 4 hours to about 9 hours, or for about 9 hours. The cellulose source and solvent may be contacted at a temperature of about 15° C. to about 30° C.

In one embodiment of any of the first to third aspects, the coagulation bath comprises water. In another embodiment, the coagulation bath consists essentially of water.

The temperature of the coagulation bath may be about 5° C. to about 15° C.

In one embodiment of any of the first to third aspects, the solid material provided in (b) comprises a fibre or film.

In one embodiment of the first aspect, the oxidising solution comprises aqueous hydrogen peroxide. In one embodiment, the oxidising solution comprises about 0.5% w/w to about 5.0% w/w hydrogen peroxide in water and, in another embodiment, about 0.5% w/w to about 1.0% w/w hydrogen peroxide in water and, in another embodiment, about 0.7% w/w hydrogen peroxide in water.

The solid material may be immersed in the oxidising solution for about 1 minute to about 5 minutes. In one embodiment, the solid material is immersed in the oxidising solution at a temperature of about 5° C. to about 15° C.

In one embodiment of the first or second aspect, step (e) comprises freeze drying the solid material from (d) to provide the cellulose-containing material. In another embodiment of the first aspect, step (e) comprises thawing the frozen solution from (d), removing the solid material from the thawed solution, and drying the solid material to provide the cellulose-containing material. In another embodiment of the second aspect, step (e) comprises thawing the frozen water from (d), removing the solid material from the thawed water, and drying the solid material to provide the cellulose-containing material. In one embodiment, the frozen solution or water is thawed at a temperature of about 5° C. to about 30° C.

In one embodiment of the third aspect, the formate salt in step (c) is selected from sodium formate, potassium formate, ammonium formate or a mixture of any two or more thereof. In one embodiment, the aqueous formate salt solution in step (c) is an aqueous solution of sodium formate. In one embodiment, the concentration of formate salt in the aqueous formate salt solution in step (c) is between about 20% w/v and about 60% w/v.

In one embodiment of the third aspect, step (d) comprises drying the solid material from (c) to form a residue of solid formate salt on the surface of the solid material, then rinsing and drying the solid material to provide the cellulose-containing material.

The cellulose-containing material provided in (e) of the first or second aspect or (d) of the third aspect may comprise a fibre or film.

In one embodiment of any of the first to third aspects, step (a) further comprises contacting a protein source with the solvent. The protein source may be contacted with the solvent simultaneously or sequentially with the cellulose source.

The protein source may comprise keratin. The protein source may comprise wool. In another embodiment, the protein source comprises casein. In another embodiment, the protein source comprises fibroin. The protein source may comprise silk.

In one embodiment of any of the first to third aspects, the protein source is formylated.

In one embodiment of any of the first to third aspects, the solvent further comprises cysteine. The solvent may comprise about 10% w/v to about 70% w/v cysteine, or about 50% w/v cysteine.

In one embodiment of any of the first to third aspects, the process further comprises:
(i) adding water to the solution from (a) to provide a precipitate;
(ii) isolating the precipitate;
(iii) drying the precipitate; and
(iv) dissolving the precipitate in formic acid to provide the solution used in (b).

In one embodiment of any of the first to third aspects, the formic acid comprises less than about 2% w/w water.

In one embodiment of any of the first to third aspects, the cellulose-containing material comprises one or more pigments from the cellulose source. The cellulose-containing material may additionally or alternatively comprise one or more fragrances from the cellulose source.

In one embodiment of any of the first to third aspects, the cellulose-containing material further contains protein.

In a fourth aspect, the present invention provides a process for producing a cellulose/protein-containing material comprising:
(a) contacting a cellulose source and a protein source with a solvent comprising zinc ions and formic acid to provide a solution;
(b) extruding the solution from (a) into a coagulation bath to provide a solid material;
(c) immersing the solid material from (b) in an oxidising solution;
(d) freezing the oxidising solution in which the solid material is immersed; and
(e) isolating the solid material from (d) to provide the cellulose/protein-containing material.

In a fifth aspect, the present invention provides a process for producing a cellulose/protein-containing material comprising:
(a) contacting a cellulose source and a protein source with a solvent comprising zinc ions and formic acid to provide a solution;
(b) extruding the solution from (a) into a coagulation bath to provide a solid material;
(c) immersing the solid material from (b) in water;
(d) freezing the water in which the solid material is immersed; and
(e) isolating the solid material from (d) to provide the cellulose/protein-containing material.

In a sixth aspect, the present invention provides a process for producing a cellulose/protein-containing material comprising:

(a) contacting a cellulose source and a protein source with a solvent comprising zinc ions and formic acid to provide a solution;
(b) extruding the solution from (a) into a coagulation bath to provide a solid material;
(c) immersing the solid material from (b) in an aqueous formate salt solution; and
(d) isolating the solid material from (c) to provide the cellulose/protein-containing material.

In one embodiment of any of the fourth to sixth aspects, the protein source comprises keratin. The protein source may comprise wool. In another embodiment, the protein source comprises casein. In another embodiment, the protein source comprises fibroin. The protein source may comprise silk.

In a seventh aspect, the present invention provides a process for producing a cellulose/protein-containing material comprising:
(a) contacting a cellulose source with a solvent comprising zinc ions and formic acid to provide a solution;
(b) contacting the solution from (a) with a protein source to provide a solution;
(c) extruding the solution from (b) into a coagulation bath to provide a solid material;
(d) immersing the solid material from (c) in an oxidising solution;
(e) freezing the oxidising solution in which the solid material is immersed; and isolating the solid material from (e) to provide the cellulose/protein-containing material.

In an eighth aspect, the present invention provides a process for producing a cellulose/protein-containing material comprising:
(a) contacting a cellulose source with a solvent comprising zinc ions and formic acid to provide a solution;
(b) contacting the solution from (a) with a protein source to provide a solution;
(c) extruding the solution from (b) into a coagulation bath to provide a solid material;
(d) immersing the solid material from (c) in water;
(e) freezing the water in which the solid material is immersed; and isolating the solid material from (e) to provide the cellulose/protein-containing material.

In a ninth aspect, the present invention provides a process for producing a cellulose/protein-containing material comprising:
(a) contacting a cellulose source with a solvent comprising zinc ions and formic acid to provide a solution;
(b) contacting the solution from (a) with a protein source to provide a solution;
(c) extruding the solution from (b) into a coagulation bath to provide a solid material;
(d) immersing the solid material from (c) in an aqueous formate salt solution; and
(e) isolating the solid material from (d) to provide the cellulose/protein-containing material.

In one embodiment of any of the seventh to ninth aspects, the protein source comprises keratin formate.

In a tenth aspect, the present invention provides a process for producing a cellulose/protein-containing material comprising:
(a) contacting a cellulose source and a protein source with a solvent comprising zinc ions and formic acid to provide a solution;
(b) adding water to the solution from (a) to provide a precipitate;
(c) isolating the precipitate;
(d) drying the precipitate from (c);
(e) dissolving the precipitate from (d) in formic acid to provide a solution;
(f) extruding the solution from (e) into a coagulation bath to provide a solid material;
(g) immersing the solid material from (f) in an oxidising solution;
(h) freezing the oxidising solution in which the solid material is immersed; and isolating the solid material from (h) to provide the cellulose/protein-containing material.

In an eleventh aspect, the present invention provides a process for producing a cellulose/protein-containing material comprising:
(a) contacting a cellulose source and a protein source with a solvent comprising zinc ions and formic acid to provide a solution;
(b) adding water to the solution from (a) to provide a precipitate;
(c) isolating the precipitate;
(d) drying the precipitate from (c);
(e) dissolving the precipitate from (d) in formic acid to provide a solution;
(f) extruding the solution from (e) into a coagulation bath to provide a solid material;
(g) immersing the solid material from (f) in an oxidising solution;
(h) freezing the oxidising solution in which the solid material is immersed; and isolating the solid material from (h) to provide the cellulose/protein-containing material.

In a twelfth aspect, the present invention provides a process for producing a cellulose/protein-containing material comprising:
(a) contacting a cellulose source and a protein source with a solvent comprising zinc ions and formic acid to provide a solution;
(b) adding water to the solution from (a) to provide a precipitate;
(c) isolating the precipitate;
(d) drying the precipitate from (c);
(e) dissolving the precipitate from (d) in formic acid to provide a solution;
(f) extruding the solution from (e) into a coagulation bath to provide a solid material;
(g) immersing the solid material from (f) in an aqueous formate salt solution; and
(h) isolating the solid material from (g) to provide the cellulose/protein-containing material.

In one embodiment of any of the tenth to twelfth aspects, the protein source comprises keratin.

Other embodiments of the processes of the fourth to twelfth aspects of the invention incorporate the features of the various embodiments of the processes of the first to third aspects of the invention described above.

The present invention also provides a material produced by a process of the invention.

In another aspect, the present invention provides an extruded material comprising cellulose and protein. In another aspect, the present invention provides a substantially continuous material comprising cellulose and protein.

In one embodiment, the material consists essentially of cellulose and protein. In another embodiment, the material consists of cellulose and protein.

The material may be a fibre or a film.

In one embodiment, the material has a protein content of about 5% w/w or more. The protein may comprise keratin. The keratin may be derived from wool.

The cellulose may be derived from cotton, wood pulp, plant parts or a mixture of any two or more thereof. In one embodiment, the material comprises one or more pigments and/or one or more fragrances from the plant parts.

In another aspect, the present invention provides an extruded material comprising cellulose and one or more pigments and/or fragrance from plant parts. In another aspect, the present invention provides a substantially continuous material comprising cellulose and one or more pigments and/or one or more fragrances from plant parts.

Although the present invention is broadly as defined above, those persons skilled in the art will appreciate that the invention is not limited thereto and that the invention also includes embodiments of which the following description gives examples.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

DETAILED DESCRIPTION

The term "comprising" as used in this specification means "consisting at least in part of". When interpreting statements in this specification which include that term, the features, prefaced by that term in each statement or claim, all need to be present but other features can also be present. Related terms such as "comprise" and "comprises" are to be interpreted in the same manner.

The term "% w/v" as used in this in this specification means the weight in grams of a solute per 100 ml of a solution.

The present invention broadly relates to a process for producing cellulose-containing materials by solubilising cellulose from a cellulose source then processing the resulting solution to produce, for example, reconstituted cellulose fibres and films. The process can also further comprise solubilising protein and processing the resulting solution to produce, for example, reconstituted cellulose/protein fibres and films.

Without wishing to be bound by theory, it is thought that formylating natural polymer materials, such as cellulose, including cellulose having a high degree of polymerisation, and proteins, such as keratin, casein and fibroin, renders these generally insoluble natural polymer materials soluble in formic acid. The inventor has determined that solvent systems comprising zinc ions and formic acid are able to formylate the natural polymer materials and so produce formic acid solutions suitable for further processing.

Extrusion of the resulting formic acid solutions into a coagulation bath generates products comprising the polymer materials. For example, wet spinning can be used to generate the materials as fibres.

Advantageously, a cellulose source and a protein source may be solubilised in the same solution, or in separate solutions that are then combined prior to extrusion.

Without wishing to be bound by theory, it is thought that the initial product of the extrusion comprises, for example, cellulose formate or cellulose/keratin formate, when the protein source comprises keratin. Cellulose formate is an unstable material, but the inventor has determined that, for example, the use of oxidants and low temperature processing, or other process steps as described herein, can stabilise the extruded material and generate cellulose and cellulose/protein fibres that are suitable for textile processing.

Accordingly, the present invention relates to a process for producing a cellulose-containing material comprising contacting a cellulose source with a solvent comprising zinc ions and formic acid to provide a solution, extruding the solution into a coagulation bath to provide a solid material, treating the solid material, and isolating the solid material after treatment, to provide the cellulose-containing material.

The present invention also relates to a process for producing a cellulose-containing material comprising:
(a) contacting a cellulose source with a solvent comprising zinc ions and formic acid to provide a solution;
(b) extruding the solution from (a) into a coagulation bath to provide a solid material;
(c) immersing the solid material from (b) in a treatment liquid;
(d) optionally freezing the treatment liquid in which the solid material is immersed; and
(e) isolating the solid material from (c) or (d) to provide the cellulose-containing material.

Many variations of this process are set out below.

More specifically, one aspect of the present invention relates to a process for producing a cellulose-containing material comprising:
(a) contacting a cellulose source with a solvent comprising zinc ions and formic acid to provide a solution;
(b) extruding the solution from (a) into a coagulation bath to provide a solid material;
(c) immersing the solid material from (b) in an oxidising solution;
(d) freezing the oxidising solution in which the solid material is immersed; and
(e) isolating the solid material from (d) to provide the cellulose-containing material.

The solvent comprises zinc ions and formic acid. In one embodiment, the solvent comprises a solution of zinc formate in formic acid.

The concentration of zinc formate may be about 20% w/v to about 40% w/v. It may be difficult to dissolve a cellulose source in solutions having significantly lower or higher concentrations of zinc formate. In one embodiment, the concentration of zinc formate is about 40% w/v.

The solvent may be prepared by dissolving zinc formate in formic acid. Preferably, the zinc formate comprises less than about 5% w/w water, more preferably less than about 2% w/w water. More preferably, the zinc formate is substantially anhydrous.

While zinc formate is commercially available as a dihydrate, the dihydrate has poor solubility in formic acid.

Preferably, the formic acid is at least 90% w/w formic acid. More preferably, the formic acid is about 95% w/w formic acid, more preferably about 98% w/w formic acid. Formic acid is commercially available in such concentrations.

In a preferred embodiment, the solvent comprises a concentration of anhydrous zinc formate of about 20% w/v to about 40% w/v in 98% formic acid.

Advantageously, minimising the amount of water in the solvent has been found to improve the solubility of the cellulose source material in the solvent.

The solvent typically comprises less than about 10% w/w water. Preferably, the solvent comprises less than about 5% w/w water. More preferably, the solvent comprises less than about 2% w/w water. In one embodiment, the solvent comprises less than about 1% w/w water.

The solubility of cellulose in the solvent typically increases with as the water content of the solvent decreases.

Zinc formate may be prepared by reacting a zinc halide, including zinc chloride, zinc bromide or a mixture thereof, with concentrated formic acid. The resulting zinc formate can be isolated, typically as a powder, and dried to provide anhydrous zinc formate. The zinc formate may then be dissolved in formic acid to provide the solvent comprising zinc ions and formic acid.

Alternatively, the solvent comprising zinc ions and formic acid may be produced in situ by reacting the zinc halide with concentrated formic acid and without isolating zinc formate.

The concentration of zinc halide in the formic acid is typically about 10% w/v to about 50% w/v. Preferably, the concentration of zinc halide is about 20% w/v to about 50% w/v. More preferably, the concentration of zinc halide is about 20% w/v to about 45% w/v. In one embodiment, the concentration of zinc halide is about 40% w/v. In another embodiment, the concentration of zinc halide is about 25% w/v.

Preferably, the zinc halide comprises less than about 5% w/w water, more preferably less than about 2% w/w water. More preferably, the zinc halide is substantially anhydrous.

In a preferred embodiment, the solvent comprises a concentration of anhydrous zinc chloride of about 20% w/v to about 50% w/v in 98% formic acid The solvent is contacted with a cellulose source to provide a solution. During the contacting, the cellulose source dissolves. A variety of cellulose sources are suitable for use in the invention. For example, native cellulose sources having a relatively low degree of polymerisation, but also cellulose sources having a relatively high degree of polymerisation (DP).

Low DP cellulose sources, having a DP of up to about 1000 or about 800-1200, such as wood pulp, are readily dissolved in the solvent of the invention. Wood pulp can also be dissolved in other common solvent systems, such as those using xanthate, cuprammonium complex or N-methylmorpholine N-oxide. But dissolution of higher DP cellulose sources is generally not possible in these solvent systems.

Cotton linter typically has a DP of about 1000-2000 and cotton may have a DP of about 1500-5000 or higher.

Surprisingly, the zinc ion/formic acid solvent of the invention has been found to dissolve relatively high DP cellulose sources, for example cellulose sources having a DP of up to about 5000, such as cotton (including Egyptian cotton). In one embodiment, the solvent of the invention dissolves about 2% w/v cotton.

In one embodiment, the cellulose source comprises cellulose with a DP of at least about 1000. In another embodiment, the cellulose source comprises cellulose with a DP of at least about 1200.

The cellulose source may comprise a mixture of two or more cellulose sources, each of which has the same or a different DP. For example, the cellulose source may comprise a mixture of two or more of cotton, wood pulp and plant parts. In one embodiment, the cellulose source comprises a mixture of cotton and wood pulp. In another embodiment, the cellulose source comprises a mixture of cotton and plant parts. In another embodiment, the cellulose source comprises a mixture of wood pulp and plant parts. In another embodiment, the cellulose source comprises a mixture of cotton, wood pulp and plant parts.

Advantageously, the solvent of the present invention may be used to solubilise cellulose from whole and/or unprocessed plant parts, such as leaves, petals and fruit skins. Preferred plant parts include leaves and petals.

Such plant parts typically contain additional components, such as hemi-cellulose, pectin and other non-structural polysaccharides, which interfere with the xanthate or cuprammonium processes used in rayon processing and render them ineffective.

Advantageously, such plant parts may be dissolved using the solvent of the present invention.

Other features of plant parts, for example colour and/or fragrance, associated with cellulose sources, such as leaves and flower petals, also cannot be processed through existing cellulose dissolution routes. Advantageously, cellulose-containing materials produced by the process of the present invention can retain the colour and/or fragrance features of the cellulose source. For example, fibres that are rose coloured and have a rose fragrance can be produced using rose petals as the cellulose source. Similarly, fibres that are green or brown can be produced using the same coloured leaves as the cellulose source.

Accordingly, the cellulose-containing material may comprise one or more pigments from the cellulose source. Alternatively or additionally, the cellulose-containing material may comprise one or more fragrances from the cellulose source.

Without wishing to be bound by theory, it is thought the solvent of the invention generates cellulose formate with a low degree of substitution, generally 2 or less, and may generate cellulose formate with a degree of substitution of 1 or less. While cellulose formate with a high degree of substitution has a high solubility in a range of solvent systems, including concentrated formic acid, DMF and DMSO, previous approaches to using cellulose formate with a low degree of substitution, for example 2 or less or 1 or less, have typically not provided solutions with a high enough concentration (sufficient solubility of cellulose) to allow wet spinning.

Surprisingly, the inventor has found that the solvent system of the invention provides cellulose formate with a low degree of substitution, and is able to produce solutions with a sufficiently high concentration of cellulose for subsequent wet spinning of fibres. In one embodiment, the solvent of the invention dissolves up to about 5% w/v cellulose in a solvent comprising 98% formic acid. In another embodiment, the solvent of the invention dissolves up to about 4% w/v cellulose in a solvent comprising 98% formic acid. In another embodiment, the solvent of the invention dissolves up to about 3.5% w/v cellulose in a solvent comprising 98% formic acid. In another embodiment, the solvent of the invention dissolves up to about 3% w/v cellulose in a solvent comprising 98% formic acid. In another embodiment, the solvent of the invention dissolves up to about 2.5% w/v cellulose in a solvent comprising 98% formic acid. In another embodiment, the solvent of the invention dissolves up to about 2.3% w/v cellulose in a solvent comprising 98% formic acid. In another embodiment, the solvent of the invention dissolves up to about 2% w/v cellulose in a solvent comprising 98% formic acid.

The cellulose source and the solvent are typically contacted for a time sufficient to dissolve the cellulose. The cellulose source may conveniently be contacted by immersing it into the solvent. However, the invention is not limited thereto and other suitable methods will be apparent to those persons skilled in the art.

The contacting time may depend on the DP of the cellulose in the cellulose source. In one embodiment, the contacting time is about 4 hours to about 9 hours. Contacting times outside this range may, however, still be useful. For example, a contacting time of about 4 hours may be sufficient to dissolve cellulose having a relatively low DP, while a contacting time of about 9 hours may be required to dissolve cellulose having a relatively high DP.

In one embodiment, the mixture of cellulose source and solvent is agitated, stirred or otherwise mixed during contacting. The agitation, stirring or mixing may be continuous or discontinuous during the contacting.

In one embodiment, the amount of cellulose source is up to about 5% w/v of solvent. In another embodiment, the amount of cellulose source is up to about 4% w/v of solvent. In another embodiment, the amount of cellulose source is up to about 3.5% w/v of solvent. In another embodiment, the amount of cellulose source is up to about 3% w/v of solvent. In another embodiment, the amount of cellulose source is up to about 2.5% w/v of solvent. In another embodiment, the amount of cellulose source is up to about 2.3% w/v of solvent. In another embodiment, the amount of cellulose source is up to about 2% w/v of solvent.

The temperature at which the contacting step is performed may be, for example, about 15° C. to about 30° C. Temperatures outside this range may, however, still be useful. Advantageously, the contacting step may be performed at ambient (room) temperature, typically about 20° C. to about 25° C.

The resulting solution may comprise up to about 5% w/v cellulose. Accordingly, in one embodiment, the solution comprises about 5% w/v cellulose. In another embodiment, the solution comprises about 4% w/v cellulose. In another embodiment, the solution comprises about 3.5% w/v cellulose. In another embodiment, the solution comprises about 3% w/v cellulose. In another embodiment, the solution comprises about 2.5% w/v cellulose. In another embodiment, the solution comprises about 2.3% w/v cellulose. In another embodiment, the solution comprises about 2% w/v cellulose.

As explained above, keratin derived from wool or other sources such feathers, horns and hooves, can be processed to create extruded fibres, typically with chemical modification to create a derivative suitable for wet spinning. However, reconstituted protein fibres typically have relatively low tenacity and high brittleness when compared to protein fibres in their native state, such as silk and wool.

Advantageously, the process of the present invention can be used to produce a cellulose/protein-containing material. It has not previously been possible achieve a combination of the natural polymers cellulose and protein in a single reconstituted material, for example as a fibre. The combination of these two natural polymer materials in a single product may have the potential to go at least some way to overcoming the previously limiting problems of weakness and brittleness in reconstituted protein fibres and/or at least provide the public with a useful choice.

Previous systems for dissolution and coagulation of proteins, such as keratin, casein and fibroin, have not utilised derivatisation by formylation in order to achieve dissolution.

Accordingly, another aspect of the present invention relates to a process for producing a cellulose/protein-containing material comprising:
(a) contacting a cellulose source with a solvent comprising zinc ions and formic acid to provide a solution;
(b) contacting the solution from (a) with a protein source to provide a solution;
(c) extruding the solution from (b) into a coagulation bath to provide a solid material;
(d) immersing the solid material from (c) in an oxidising solution;
(e) freezing the oxidising solution in which the solid material is immersed; and isolating the solid material from (e) to provide the cellulose/protein-containing material.

Accordingly, another aspect of the present invention relates to a process for producing a cellulose/protein-containing material comprising:
(a) contacting a protein source with a solvent comprising zinc ions and formic acid to provide a solution;
(b) contacting the solution from (a) with a cellulose source to provide a solution;
(c) extruding the solution from (b) into a coagulation bath to provide a solid material;
(d) immersing the solid material from (c) in an oxidising solution;
(e) freezing the oxidising solution in which the solid material is immersed; and isolating the solid material from (e) to provide the cellulose/protein-containing material.

Another aspect of the present invention relates to a process for producing a cellulose/protein-containing material comprising:
(a) contacting a cellulose source and a protein source with a solvent comprising zinc ions and formic acid to provide a solution;
(b) extruding the solution from (a) into a coagulation bath to provide a solid material; (c) immersing the solid material from (b) in an oxidising solution;
(d) freezing the oxidising solution in which the solid material is immersed; and
(e) isolating the solid material from (d) to provide the cellulose/protein-containing material.

Preferred protein sources comprise keratin, preferably wool, casein or fibroin, preferably silk. In one embodiment, the protein source comprises keratin. In another embodiment, the protein source comprises casein. In another embodiment, the protein source comprises fibroin.

Fibrous proteins (also known as scleroproteins) are generally inert and insoluble in water. Fibrous proteins form long protein filaments shaped like rods or wires. They are structural or storage proteins. Fibrous proteins include keratin and fibroin.

In one embodiment, the protein source comprises keratin. Suitable protein sources comprising keratin include, but are not limited to, wool, hair, horns, hooves and feathers. In one embodiment, particularly wherein the protein source comprises a material such as horns or hooves, the material may be comminuted prior to contact with the solvent.

In one embodiment, the protein source comprises wool, hair, or feathers, or a mixture of any two or more thereof. In another embodiment, the protein source comprises wool or feathers, or a mixture thereof. In a preferred embodiment, the protein source comprises wool, consists essentially of wool, or consists of wool.

Wool is a keratin protein fibre and is produced by various animals including sheep, goats, camels and rabbits. The fibre structure typically comprises a cuticle, cortex, and medulla, although fine wools may lack the medulla.

Preferably, the wool is sheep wool.

The diameter of sheep wool typically ranges from about 10 microns to about 45 microns. Fibre diameter is an important characteristic of wool in relation to its quality and price. Finer wools are softer and suitable for use in garment manufacturing. There are a limited number of consumer applications remaining for stronger wool types such as flooring, bedding, upholstery, and hand knitting yarns.

The protein source may comprise a mixture of two or more protein sources. For example, the protein source may comprise a mixture of two or more of keratin, preferably wool, casein or fibroin, preferably silk.

When the protein source comprises keratin, and preferably wool, a reducing agent is typically added to the solvent. A preferred reducing agent is cysteine. Without wishing to be bound by theory, it is thought that cysteine assists with disulfide bond reduction and stabilisation of the zinc formate complex.

In one embodiment, the solvent comprises about 10% w/v to about 70% w/v cysteine. In another embodiment, the solvent comprises about 50% w/v cysteine.

The cysteine-containing solvent of the invention surprisingly dissolves whole wool up to a concentration of about 30% w/v.

Without wishing to be bound by theory, it is thought that keratin formate is formed during dissolution, in which the cystine component of the keratin protein is formylated.

It may be advantageous to isolate the keratin formate. For example, keratin formate may be isolated from a solution in a solvent system comprising cysteine and wool by precipitation, for example by adding water to the solution. The resulting keratin formate precipitate may be isolated by filtration and dried.

Accordingly, in one embodiment, the process of the invention comprises:
(a) contacting a keratin source with a solvent comprising a reducing agent, zinc ions and formic acid to provide a solution;
(i) adding water to the solution from (a) to provide a precipitate;
(ii) isolating the precipitate from (i);
(iii) drying the precipitate from (ii).

A preferred keratin source is wool.

The dried precipitate, which is thought to comprise keratin formate, may be dissolved in formic acid. The dried precipitate may also be added to the solution provided by contacting a cellulose source with a solvent comprising zinc ions and formic acid, prior to extrusion and subsequent further process steps.

Other protein sources, including those comprising casein and fibroin, are also soluble in the solvent of the invention. No reducing agent or cysteine is required for dissolution of these proteins, due to the absence or very low level of cystine in these protein sources.

The solvent of the invention may dissolve up to about 60% w/v of casein and up to about 20% w/v fibroin.

The solvent comprising dissolved protein can be contacted with a cellulose source, the solution provided by contacting a protein source with a solvent comprising zinc ions and formic acid being used to dissolve the cellulose. Alternatively, the solvent comprising dissolved cellulose can be contacted with a protein source, the solution provided by contacting a cellulose source with a solvent comprising zinc ions and formic acid being used to dissolve the protein. As a further alternative, a cellulose source and protein source can be simultaneously contacted with a zinc ion/formic acid solvent of the invention to provide a solution.

The resulting solution, comprising both dissolved cellulose and protein can then be extruded and further processed to provide a cellulose/protein-containing material.

Alternatively, it may be advantageous to isolate a solid after the initial solubilisation step, and use that solid to prepare a formic acid solution for extrusion and subsequent processing.

Accordingly, another aspect of the present invention relates to a process for producing a cellulose/protein-containing material comprising:
(a) contacting a cellulose source and a protein source with a solvent comprising zinc ions and formic acid to provide a solution;
(b) adding water to the solution from (a) to provide a precipitate;
(c) isolating the precipitate;
(d) drying the precipitate from (c);
(e) dissolving the precipitate from (d) in formic acid to provide a solution;
(f) extruding the solution from (e) into a coagulation bath to provide a solid material;
(g) immersing the solid material from (f) in an oxidising solution;
(h) freezing the oxidising solution in which the solid material is immersed; and
(i) isolating the solid material from (h) to provide the cellulose/protein-containing material.

The protein source may be contacted with the solvent simultaneously or sequentially with the cellulose source. When the contacting is sequential, the protein source may be contacted with the solvent either before or after the cellulose source is contacted with the solvent.

A preferred protein source comprises keratin, and the solvent then preferably further comprises a reducing agent, preferably cysteine.

In those embodiments comprising contacting a protein source and the solvent, the contacting is typically for a time sufficient to dissolve the protein source. In one embodiment, the contacting time is about 5 hours to about 8 hours. Contacting times outside this range may, however, still be useful.

The temperature at which this contacting step is performed may be, for example, up to about 35° C. Temperatures outside this range may, however, still be useful.

Cellulose formate is a relatively unstable material. Decomposition of the substituents releases formic acid, which can hydrolyse and degrade the regenerated cellulose material. This instability has prevented the widespread use of cellulose formate, despite the extensive use of other cellulose derivatives, such as cellulose acetate. The stability of cellulose formate is inversely proportional to the degree of substitution. While a degree of substitution of 2 or 3 (cellulose diformate or cellulose triformate) leads to higher solubility in the solvent of the spinning solution, the resulting extruded fibres are generally unstable, decomposing to release formic acid in the presence of heat leading to fibre degradation. Advantageously, the process of the present invention has been found to produce stable cellulose formate material with a degree of substitution of up to about 2. Such materials have further been found to be both sufficiently soluble for spinning and sufficiently stable for practical use as a textile fibre.

In the process of the present invention, the solution of cellulose or cellulose/protein in the solvent is extruded into a coagulation bath to provide a solid material.

The solution may be filtered to remove physical impurities and provide a homogeneous solution before extrusion.

Two or more solutions prepared from the same or different cellulose sources may be combined before extrusion.

Similarly, a solution prepared from a cellulose source may be combined with a solution prepared from a protein source prior to extrusion. Alternatively, one or more solutions prepared from one or more cellulose sources may be combined with one or more solutions prepared from one or more protein sources prior to extrusion.

As a further alternative, one or more cellulose/protein solutions may be combined, optionally with one or more solutions prepared from one or more cellulose sources and/or one or more solutions prepared from one or more protein sources.

Those persons skilled in the art will appreciate that the solution can be extruded into a coagulation bath in any shape such that the solid material can be formed, for example, as a fibre, film, sheet, coating or particle.

In one embodiment, the solid material is formed as a film by extrusion of the solution through a narrow slit into a coagulation bath.

In another embodiment, the solution is formed into fibres using a conventional wet spinning machine typically used for viscose. In this embodiment, the solution is typically pumped through a spinneret into a coagulation bath.

Advantageously, the wet spinning process enables the production of fibres of any desired diameter by selecting the appropriate spinneret. The resulting fibres have a consistent diameter and may be produced as single long filaments. This contrasts with naturally occurring fibres, such as wool, which form as staples and for which the diameter is variable and the length limited.

When the solid material is formed as fibres, the fibres may be wound onto a bobbin. For example, the extruded fibres may be collected on a take up roller, optionally drawn as required between rollers to improve fibre tensile properties, and then wound onto a bobbin. The fibres may also be cut if short staple fibres are required. In one embodiment, the solid material is formed as a plurality of short fibres by, for example, rapidly forcing the solution through a spinneret into the coagulation bath.

The coagulation bath typically comprises, consists essentially of or consists of water. However, the invention is not limited thereto. For example, the coagulation bath may comprise 1-10% v/v formic acid and/or a soluble formate salt. The formate salt may be selected from, for example, lithium formate, sodium formate, potassium formate, calcium formate, copper formate, zinc formate, ammonium formate and mixtures of any two or more thereof. In one embodiment, the concentration of formate salt in the coagulation bath is between about 20% w/v and about 60% w/v.

The coagulation bath is typically maintained at a temperature of about 5° C. to about 15° C. Without wishing to be bound by theory, it is thought that extrusion within this temperature range forms the solid material without decomposition of the formate functionality.

The inventor has surprisingly determined that the resulting solid material can be further stabilised by treatment with an oxidising solution, to subsequently provide the cellulose-containing material or cellulose/protein-containing material.

Accordingly, the solid material is typically immersed in an oxidising solution. A preferred oxidising solution comprises aqueous hydrogen peroxide. However, the invention is not limited thereto and other oxidising solutions, including water comprising a sufficient amount of dissolved oxygen, can be used. For example, water through which air or oxygen has been passed, such that it is saturated with dissolved oxygen.

In one embodiment, the oxidising solution comprises about 0.5% w/w to about 5.0% w/w hydrogen peroxide in water. In another embodiment, the oxidising solution comprises about 0.5% w/w to about 1.0% w/w hydrogen peroxide in water. In another embodiment, the oxidising solution comprises about 0.7% w/w hydrogen peroxide in water. For example, a suitable oxidising solution may be prepared by mixing 2% w/v of 35% w/w hydrogen peroxide with water.

Typically, the solid material is immersed in the oxidising solution for about 1 to about 5 minutes. Immersion times outside this range may, however, still be useful.

After immersion of the solid material in the oxidising solution, the oxidising solution in which the solid material is immersed is frozen. For example, the solution may be held in an environment at about −20° C. until frozen solid. In one embodiment, the solution is frozen for at least about 2 hours.

The solid material is then isolated to provide the cellulose-containing material or cellulose/protein-containing material. In one embodiment, the solid material is isolated by freeze drying to provide the cellulose-containing material or cellulose/protein-containing material. In another embodiment, the frozen solution is thawed, and the solid material removed from the thawed solution, then dried to provide the cellulose-containing material or cellulose/protein-containing material.

In a preferred embodiment, the frozen solution is thawed at a temperature of about 5° C. to about 30° C. Temperatures outside this range may, however, still be useful. Advantageously, the frozen solution may be thawed at ambient (room) temperature, typically about 20° C. to about 25° C.

After removal of the solid material from the thawed solution, it may be air dried at ambient (room) temperature, typically about 20° C. to about 25° C., to provide the cellulose-containing material or cellulose/protein-containing material. Preferably, the use of a heat source is avoided during air drying of the solid material.

Without wishing to be bound by theory, it is thought the oxidising solution may convert the formate substituents to performate substituents. The performate substituents may then rearrange to carbonate and either the performate substituents or carbonate are removed by the subsequent freeze-thaw cycle, or freeze drying. The evaporation of the released formic acid during the process of the present invention is thought to stabilise the cellulose-containing material or cellulose/protein-containing material. Otherwise, formic acid would be expected to act on the material with consequential weakening and degradation.

As an alternative to stabilisation by treatment with an oxidising solution as described above, the solid material may be soaked in water and then frozen, to subsequently provide the cellulose-containing material or cellulose/protein-containing material.

Accordingly, another aspect of the present invention relates to a process for producing a cellulose-containing material comprising:
  (a) contacting a cellulose source with a solvent comprising zinc ions and formic acid to provide a solution;
  (b) extruding the solution from (a) into a coagulation bath to provide a solid material;
  (c) immersing the solid material from (b) in water;
  (d) freezing the water in which the solid material is immersed; and
  (e) isolating the solid material from (d) to provide the cellulose-containing material.

Another aspect of the present invention relates to a process for producing a cellulose/protein-containing material comprising:

(a) contacting a cellulose source with a solvent comprising zinc ions and formic acid to provide a solution;
(b) contacting the solution from (a) with a protein source to provide a solution;
(c) extruding the solution from (b) into a coagulation bath to provide a solid material;
(d) immersing the solid material from (c) in water;
(e) freezing the water in which the solid material is immersed; and
(f) isolating the solid material from (e) to provide the cellulose/protein-containing material.

Accordingly, another aspect of the present invention relates to a process for producing a cellulose/protein-containing material comprising:
(a) contacting a protein source with a solvent comprising zinc ions and formic acid to provide a solution;
(b) contacting the solution from (a) with a cellulose source to provide a solution;
(c) extruding the solution from (b) into a coagulation bath to provide a solid material;
(d) immersing the solid material from (c) in water;
(e) freezing the water in which the solid material is immersed; and
(f) isolating the solid material from (e) to provide the cellulose/protein-containing material.

Another aspect of the present invention relates to a process for producing a cellulose/protein-containing material comprising:
(a) contacting a cellulose source and a protein source with a solvent comprising zinc ions and formic acid to provide a solution;
(b) extruding the solution from (a) into a coagulation bath to provide a solid material;
(c) immersing the solid material from (b) in water;
(d) freezing the water in which the solid material is immersed; and
(e) isolating the solid material from (d) to provide the cellulose/protein-containing material.

Another aspect of the present invention relates to a process for producing a cellulose/protein-containing material comprising:
(a) contacting a cellulose source and a protein source with a solvent comprising zinc ions and formic acid to provide a solution;
(b) adding water to the solution from (a) to provide a precipitate;
(c) isolating the precipitate;
(d) drying the precipitate from (c);
(e) dissolving the precipitate from (d) in formic acid to provide a solution;
(f) extruding the solution from (e) into a coagulation bath to provide a solid material;
(g) immersing the solid material from (f) in water;
(h) freezing the water in which the solid material is immersed; and
(i) isolating the solid material from (h) to provide the cellulose/protein-containing material.

Typically, the solid material is immersed in water for about 1 to about 90 minutes. Immersion times outside this range may, however, still be useful. Preferably, the immersion time is about 30 minutes.

As described above, the solid material is then isolated to provide the cellulose-containing material or cellulose/protein-containing material. In one embodiment, the solid material is isolated by freeze drying to provide the cellulose-containing material or cellulose/protein-containing material. In another embodiment, the frozen water is thawed, and the solid material removed from the thawed water, then dried to provide the cellulose-containing material or cellulose/protein-containing material.

In a preferred embodiment, the water is thawed at a temperature of about 5° C. to about 30° C. Temperatures outside this range may, however, still be useful. Advantageously, the water may be thawed at ambient (room) temperature, typically about 20° C. to about 25° C.

After removal of the solid material from the thawed water, it may be air dried at ambient (room) temperature, typically about 20° C. to about 25° C., to provide the cellulose-containing material or cellulose/protein-containing material. Preferably, the use of a heat source is avoided during air drying of the solid material.

As a further alternative stabilisation treatment, the solid material may be soaked in an aqueous formate salt solution to subsequently provide the cellulose-containing material or cellulose/protein-containing material. The coagulation bath may comprise a soluble formate salt, as described above. However, the aqueous formate salt solution in which the solid material is soaked is typically a different solution. Preferably, the concentration of formate salt in the aqueous formate salt solution is higher than that in the coagulation bath.

Accordingly, another aspect of the present invention relates to a process for producing a cellulose-containing material comprising:
(a) contacting a cellulose source with a solvent comprising zinc ions and formic acid to provide a solution;
(b) extruding the solution from (a) into a coagulation bath to provide a solid material;
(c) immersing the solid material from (b) in an aqueous formate salt solution; and
(d) isolating the solid material from (c) to provide the cellulose-containing material.

Another aspect of the present invention relates to a process for producing a cellulose/protein-containing material comprising:
(a) contacting a cellulose source with a solvent comprising zinc ions and formic acid to provide a solution;
(b) contacting the solution from (a) with a protein source to provide a solution;
(c) extruding the solution from (b) into a coagulation bath to provide a solid material;
(d) immersing the solid material from (c) in an aqueous formate salt solution; and
(e) isolating the solid material from (d) to provide the cellulose/protein-containing material.

Accordingly, another aspect of the present invention relates to a process for producing a cellulose/protein-containing material comprising:
(a) contacting a protein source with a solvent comprising zinc ions and formic acid to provide a solution;
(b) contacting the solution from (a) with a cellulose source to provide a solution;
(c) extruding the solution from (b) into a coagulation bath to provide a solid material;
(d) immersing the solid material from (c) in an aqueous formate salt solution; and
(e) isolating the solid material from (d) to provide the cellulose/protein-containing material.

Another aspect of the present invention relates to a process for producing a cellulose/protein-containing material comprising:
(a) contacting a cellulose source and a protein source with a solvent comprising zinc ions and formic acid to provide a solution;

(b) extruding the solution from (a) into a coagulation bath to provide a solid material;
(c) immersing the solid material from (b) in an aqueous formate salt solution; and
(d) isolating the solid material from (c) to provide the cellulose/protein-containing material.

Accordingly, another aspect of the present invention relates to a process for producing a cellulose/protein-containing material comprising:
(a) contacting a cellulose source and a protein source with a solvent comprising zinc ions and formic acid to provide a solution;
(b) adding water to the solution from (a) to provide a precipitate;
(c) isolating the precipitate;
(d) drying the precipitate from (c);
(e) dissolving the precipitate from (d) in formic acid to provide a solution;
(f) extruding the solution from (e) into a coagulation bath to provide a solid material;
(g) immersing the solid material from (f) in an aqueous formate salt solution; and
(h) isolating the solid material from (g) to provide the cellulose/protein-containing material.

Preferably, the formate salt is selected from sodium formate, potassium formate, ammonium formate or a mixture of any two or more thereof. In one embodiment, the aqueous formate salt solution is an aqueous solution of sodium formate. In another embodiment, the aqueous formate salt solution is an aqueous solution of potassium formate. In another embodiment, the aqueous formate salt solution is an aqueous solution of ammonium formate.

The concentration of formate salt in the aqueous formate salt solution is typically between about 20% w/v and about 60% w/v. Preferably, the concentration of formate salt is between about 45% w/v and about 55% w/v. More preferably, the concentration of formate salt is about 50% w/v.

In one embodiment, the solid material is immersed in the aqueous formate salt solution for up to about 16 hours. Shorter or longer immersion times may, however, still be useful. Preferably, the solid material is immersed in the aqueous formate salt solution for up to about 30 to about 90 minutes, more preferably about 60 minutes.

After immersion in the aqueous formate salt solution, the solid material is removed from the solution and dried. For example, the solid material may be air dried at ambient (room) temperature, typically about 20° C. to about 25° C. or at elevated temperature. Preferably, the solid material is air dried at a temperature of about 45° C.

During drying, a residue of solid formate salt forms on the surface of the solid material. Without wishing to be bound by theory, it is thought that any residual formic acid in the solid material is drawn to the solid formate salt on the surface, therefore removing it from the solid material.

After drying, the solid material is rinsed in water. The solid material may then be air dried at ambient (room) temperature, typically about 20° C. to about 25° C. or at elevated temperature, to provide the cellulose-containing material or cellulose/protein-containing material. Preferably, the solid material is air dried at a temperature of about 45° C.

The process of the present invention provides a product that can be continuous and have a form or profile controlled by the extrusion process. In contrast, the cellulose source is not continuous and the materials used as the cellulose source typically have a form or profile determined by the growth of a plant. Similar considerations apply to the protein source.

For example, the process of the invention can be used to produce cellulose/casein fibres that are flexible and fine.

Another aspect of the present invention relates to a cellulose-containing material or cellulose/protein-containing material produced by a process of the invention.

Another aspect of the present invention relates to an extruded material comprising cellulose and protein. The present invention also relates to a substantially continuous material comprising cellulose and protein.

In one embodiment, the material consists essentially of cellulose and protein. In another embodiment, the material consists of cellulose and protein.

The material may be a fibre or a film.

Preferred materials have a protein content of about 5% w/w or more.

The protein may comprise keratin. Preferably, the keratin is wool keratin.

The cellulose may be derived from, for example, cotton, wood pulp or plant parts. The material may comprise one or more pigments and/or one or more fragrances from the plant parts.

Another aspect of the invention relates to an extruded material comprising cellulose and one or more pigments and/or one or more fragrances from plant parts. Another aspect of the invention relates to a substantially continuous material comprising cellulose and one or more pigments and/or one or more fragrances from plant parts.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

The following non-limiting examples are provided to illustrate the present invention and in no way limit the scope thereof.

EXAMPLES

Example 1—Dissolution of Cellulose in Zinc Formate/Formic Acid

Part A—Preparation of Anhydrous Zinc Formate 20 grams anhydrous zinc chloride was dissolved in 50 ml water. Excess solid sodium carbonate was slowly added to this solution until gas evolution ceased. The resulting precipitate was filtered and rinsed with water to remove excess salts, including sodium chloride. The precipitate was dried at room temperature and excess 98% formic acid was added to the precipitate until gas evolution ceased. The resulting precipitate of zinc formate dihydrate was filtered and dried at room temperature. This was found to be insoluble in 98% formic acid. Zinc formate dihydrate was converted to anhydrous zinc formate through heating at 95° C. until a constant weight was achieved, approximately 30 minutes. The resulting anhydrous zinc formate was soluble in 98% formic acid.

Part B—Dissolution of Cellulose 40 grams of anhydrous zinc formate was dissolved in 100 ml 98% formic acid. 2 grams of cotton, a source of native cellulose with a high degree of polymerisation, was added to the solution and the resulting mixture stirred for 9 hours to provide a solution.

Alternatively, 5 grams of cotton was added to the zinc formate/formic acid solution and the resulting mixture stirred for 9 hours to provide a more concentrated solution.

Example 2—Dissolution of Cellulose in Zinc Bromide/Formic Acid 40 grams of zinc bromide was dissolved in 100 ml of 98% formic acid. After 1 hour, all of the salt had dissolved and the solution was heated to 80° C. and hydrogen bromide gas evolved. Once evolution of hydrogen bromide gas ceased, the solution was cooled to 15° C. and 2 grams of cotton, a source of native cellulose with a high degree of polymerisation, was dissolved in the mixture.

Example 3—Dissolution of Cellulose in Zinc Formate/Formic Acid

Part A—Preparation of Anhydrous Zinc Formate 40 grams of anhydrous zinc chloride was dissolved in 100 ml of 98% formic acid. After 1 hour, all of the salt had dissolved and the solution was heated to 80° C. and hydrogen chloride gas evolved. The solution was evaporated to dryness to remove the formic acid and water present, resulting in anhydrous zinc formate.

Part B—Dissolution of Cellulose 20 grams of the resulting solid was dissolved in 50 ml of 98% formic acid and 1 gram of cotton, a source of native cellulose with a high degree of polymerisation, was dissolved in the mixture.

Example 4—Dissolution of Plant Parts 2 grams of dehydrated rose flower petals were prepared by drying rose petals following collection. 40 grams of anhydrous zinc formate, prepared as outlined in Part A of Example 1, was dissolved in 100 ml of 98% formic acid. The dehydrated rose flower petals were added to the solution along with 2 grams of wood pulp, a source of cellulose with a high degree of polymerisation, and the mixture stirred for 9 hours to achieve complete dissolution. The resulting solution retained the colour and fragrance of the rose petals.

Solvent systems using zinc bromide and zinc chloride, as described in Examples 3 and 4, were similarly utilised with the combination of dehydrated rose petals and wood pulp to provide rose coloured solutions that retained the rose fragrance.

Example 5A—Extrusion of Fibres

The solution of Example 1 was transferred into a syringe and pumped using a syringe pump through a spinneret, consisting of 100 holes, each of 100 micron diameter, into a coagulation bath consisting of water at 5-15° C. The extruded fibres were collected on a driven take up roller from the coagulation bath and continuously transferred to a bobbin. The speed of the take up roller was set to apply a small amount of tension on the extruded fibres to ensure fine, well aligned fibres were formed.

The solutions obtained in the dissolution processes of Examples 2-4 could be used to extrude fibres in the same manner.

The bobbin of fibres, which were thought to comprise cellulose formate, was soaked in an aqueous solution containing 2% of 35% hydrogen peroxide dissolved in water. Once soaked, the fibres were frozen at −20° C. and then freeze dried. Once dry, the fibres (fibres 5A1) were processed as conventional cellulose textile fibres using standard dyeing and textile assembly processes.

Alternatively, after soaking in an aqueous solution containing 2% of 35% hydrogen peroxide dissolved in water, the fibres were frozen in an excess of the soaking solution to form a solid ice block. The ice block was then allowed to thaw at room temperature and the resulting wet fibres allowed to dry at room temperature. Once dry, the fibres (fibres 5A2) were then processed as conventional cellulose textile fibres through standard dyeing and textile assembly processes.

Example 5B—Alternative Post-Extrusion Fibre Processes

As a further alternative to Example 5A, a bobbin of fibres obtained following the extrusion process described in Example 5A was soaked in water. The fibres were then frozen in the water to form a solid ice block. The ice block was then allowed to thaw at room temperature and the resulting wet fibres allowed to dry at room temperature. Once dry, the fibres (fibres 5B1) were then processed as conventional cellulose textile fibres through standard dyeing and textile assembly processes.

As a yet further alternative, a bobbin of fibres obtained following the extrusion process described in Example 5A was soaked in an aqueous solution of 50% w/v sodium formate. After soaking for approximately 16 hours, the fibres were then dried at room temperature. After drying, a residue of sodium formate salt was observed on the fibres' surface. The fibres were then rinsed in water and the resulting wet fibres allowed to dry at room temperature. Once dry, the fibres (fibres 5B2) were then processed as conventional cellulose textile fibres through standard dyeing and textile assembly processes.

Example 5C—Comparative Post-Extrusion Fibre Processes

If the bobbin of fibres obtained following the extrusion process described in Example 5A was simply rinsed in water and dried directly after extrusion, degradation occurred on drying and the resulting fibres (fibres 5C1) lost physical strength with substantial disruption of their structure being observed.

Example 5D—Degree of Substitution

Cellulose fibres, prepared as described in Example 5B, were analysed using solid state carbon NMR, and compared with the cotton linter used to prepare the cellulose solution in Example 1, Part B. Analysis of the carbon spectrum revealed the presence of a formyl carbonyl carbon in the downfield region of the spectrum (160 ppm) relative to the glucose ring carbons (65-105 ppm), indicating derivatisation of the hydroxyl groups on the cellulose units with formyl groups and the presence of cellulose formate in the fibres. The degree of substitution of the cellulose fibres was 1.97 formyl groups per glucose unit (fibres 5B1), 1.67 formyl groups per glucose unit (fibres 5B2) or 1.51 formyl groups per glucose unit (fibres 5C1).

Example 6—Dissolution of Wool in Zinc Chloride/Formic Acid 10 grams of anhydrous zinc chloride was added to 20 ml of 98% formic acid and the solution stirred till clear. 10 grams of cysteine was added and the solution stirred for an hour until clear. 3 grams of clean, dry, crossbred wool was added and the mixture stirred for a further 5-8 hours at 35° C. 100 ml of water was added to the stirred solution, causing a precipitate to form. The precipitate was isolated by filtration and dried. The resulting dried keratin formate was further dissolved in 98% formic acid to form a solution of keratin formate.

Example 7—Dissolution of Silk or Casein in Zinc Formate or Zinc Bromide/Formic Acid The dissolution methods described in Examples 1-3 were used to separately dissolve silk or casein. Substitution of the cellulose by either 20 grams of silk per 100 ml of 98% formic acid or 40-60 grams of casein per 100 ml of formic acid and following the procedures as described in Examples 1-3 gave solutions of either silk or casein.

Example 8—Extrusion of Keratin/Cellulose Fibres 0.5 gram of cotton, a source of native cellulose of a high degree of polymerisation, was added at the same time as the wool to a solution prepared as described in Example 6. The resulting precipitate, thought to be a combination of cellulose formate and keratin formate, was isolated and dried, then dissolved in 98% formic acid. The solution was then used to extrude keratin/cellulose fibres using the methods described in Example 5A. Alternatively, the solution was then used to extrude keratin/cellulose fibres using the methods described in Example 5B.

In a variation of this Example, the concentration of zinc was halved; 5 grams of anhydrous zinc chloride was added to 20 ml of 98% formic acid. The remaining materials were added as described, specifically 10 grams of cysteine was added and dissolved, followed by 2 grams of clean, dry, crossbred wool and 1 gram of cotton. The resulting solution was used to extrude keratin/cellulose fibres using the methods described in Example 5A. Alternatively, the solution was used to extrude keratin/cellulose fibres using the methods described in Example 5B.

Example 9—Extrusion of Keratin/Cellulose Fibres

Dried keratin formate, prepared as described in Example 6, was added at an equivalent mass to the cellulose to solutions prepared by the methods of Examples 1-4. The resulting solutions were thought to contain equivalent amounts of keratin formate and cellulose formate. The solutions were extruded into keratin/cellulose fibres using the methods described in Example 5A. Alternatively, the solution was used to extrude keratin/cellulose fibres using the methods described in Example 5B.

Example 10—Extrusion of Silk/Cellulose or Casein/Cellulose Fibres

Using the dissolution process described in Example 7, 1 gram of cotton was added to the mixture at the same time as the silk or casein. The resulting solutions, which were thought to contain silk or casein and cellulose formate, were used to extrude silk/cellulose or casein/cellulose fibres using the methods described in Example 5A. Alternatively, the solution was used to extrude keratin/cellulose fibres using the methods described in Example 5B.

INDUSTRIAL APPLICATION

It will be appreciated from the discussion above that the present invention provides a process for the production of cellulose-containing and cellulose/protein-containing materials. The materials can be produced in the form of, for example, fibres or films, the dimensions of which are independent of the dimensions of the cellulose and/or protein source material. When produced in the form of fibres, the materials may be useful in, for example, textiles.

Those persons skilled in the art will understand that the above description is provided by way of illustration only and that the invention is not limited thereto. Many variations are possible without departing from the scope of the invention as set out in the accompanying claims.

The invention claimed is:

1. A process for producing a cellulose-containing material comprising:
   (a) contacting a cellulose source with a solvent comprising zinc ions and formic acid to provide a solution;
   (b) extruding the solution from (a) into a coagulation bath to provide a solid material;
   (c) immersing the solid material from (b) in an oxidising solution comprising aqueous hydrogen peroxide or in water in the absence of an oxidising agent;
   (d) freezing the oxidising solution or water in which the solid material is immersed; and
   (e) when the solid material from (b) is immersed in an oxidising solution, isolating the solid material from (d), or when the solid material from (b) is immersed in water in the absence of an oxidizing agent, thawing the frozen water from (d), removing the solid material from the thawed water, and drying the solid material to provide the cellulose-containing material.

2. A process as claimed in claim 1, wherein the cellulose source comprises cotton.

3. A process as claimed in claim 1, wherein the cellulose source comprises wood pulp.

4. A process as claimed in claim 1, wherein the cellulose source comprises a plant part.

5. A process as claimed in claim 1, wherein the cellulose source comprises a mixture of two or more cellulose sources.

6. A process as claimed in claim 1, wherein the solvent in step (a) comprises less than about 10% w/w water.

7. A process as claimed in claim 1, wherein the solvent in step (a) comprises a solution of zinc formate and formic acid.

8. A process as claimed in claim 7, wherein the concentration of zinc formate is about 20% w/v to about 40% w/v.

9. A process as claimed in claim 1, wherein the oxidising solution comprises about 0.5% w/w to about 5.0% w/w hydrogen peroxide in water.

10. A process as claimed in claim 1, wherein the solid material from (b) is immersed in an oxidising solution and step (e) comprises thawing the frozen solution from (d), removing the solid material from the thawed solution, and drying the solid material to provide the cellulose-containing material.

11. A process as claimed in claim 1, wherein the cellulose-containing material is provided as a fibre or film.

12. A process as claimed in claim 1, wherein step (a) further comprises contacting a protein source with the solvent.

13. A process as claimed in claim 12, wherein the protein source is contacted with the solvent simultaneously or sequentially with the cellulose source.

14. A process as claimed in claim 12, wherein the protein source comprises keratin.

15. A process as claimed in claim 12, wherein the protein source comprises wool.

16. A process as claimed in claim 12, wherein the cellulose-containing material further contains protein.

17. A process as claimed in claim 1, wherein the formic acid comprises less than about 2% w/w water.

18. A process as claimed in claim 1, wherein the cellulose-containing material comprises one or more pigments from the cellulose source and/or one or more fragrances from the cellulose source.

19. A process as claimed in claim 1, wherein the contacting the cellulose source is done at a temperature of about 15° C. to about 30° C.

* * * * *